United States Patent [19]

Yabuuchi et al.

[11] 4,139,456
[45] Feb. 13, 1979

[54] PROCESS FOR OXIDATION TREATMENT OF $Fe^{2+}$ IN WASTE WATER

[75] Inventors: Eizo Yabuuchi; Katsutake Fukuda, both of Okayama, Japan

[73] Assignee: Dowa Mining Co., Ltd., Tokyo, Japan

[21] Appl. No.: 816,137

[22] Filed: Jul. 15, 1977

Related U.S. Application Data

[63] Continuation of Ser. No. 631,903, Nov. 14, 1975, abandoned.

[30] Foreign Application Priority Data

Apr. 30, 1975 [JP] Japan .................. 50-52308

[51] Int. Cl.$^2$ .............................................. C02C 1/04
[52] U.S. Cl. .......................................... 210/7; 210/17; 210/45
[58] Field of Search .................. 210/2, 3, 4, 5, 7, 11, 210/17, 18, 47, 150, 151, 502, 45, 6

[56] References Cited

U.S. PATENT DOCUMENTS

| | | | |
|---|---|---|---|
| 3,218,252 | 11/1965 | Glover et al. | 210/4 |
| 3,232,434 | 2/1966 | Albersmeyer | 210/151 |
| 3,461,067 | 8/1969 | Matsumoto | 210/47 |
| 3,480,144 | 11/1969 | Barth | 210/18 |
| 3,617,560 | 11/1971 | Duel | 210/47 |
| 3,779,906 | 12/1973 | Levin | 210/7 |
| 3,904,518 | 9/1975 | Hutton | 210/17 |
| 3,929,630 | 12/1975 | Smith | 210/17 |
| 3,968,036 | 7/1976 | Liles et al. | 210/18 |

FOREIGN PATENT DOCUMENTS

| | | | |
|---|---|---|---|
| 1333585 | 10/1973 | Canada | 210/17 |
| 1517696 | 5/1965 | Fed. Rep. of Germany | 210/47 |
| 4744717 | 11/1972 | Japan | 210/3 |

OTHER PUBLICATIONS

The Condensed Chemical Dictionary, eight edition, revisee by Hawley, van Norstrand Reinhold Co., New Yrok, 1971, p. 274.

Primary Examiner—Frank A. Spear, Jr.
Assistant Examiner—Ernest G. Therkorn
Attorney, Agent, or Firm—Flynn & Frishauf

[57] ABSTRACT

Improved process for the oxidation of the $Fe^{2+}$ in waste water is disclosed. The process is especially advantageous when applied to low pH acidic waste waters containing substantial amount of the $Fe^{2+}$ and is carried out by making use of acid-proof, porous material as a bed-material for iron bacteria to inhabit. The bed-material is suspended in the waste water to be treated and is used repeatedly in a closed circuit.

2 Claims, 4 Drawing Figures

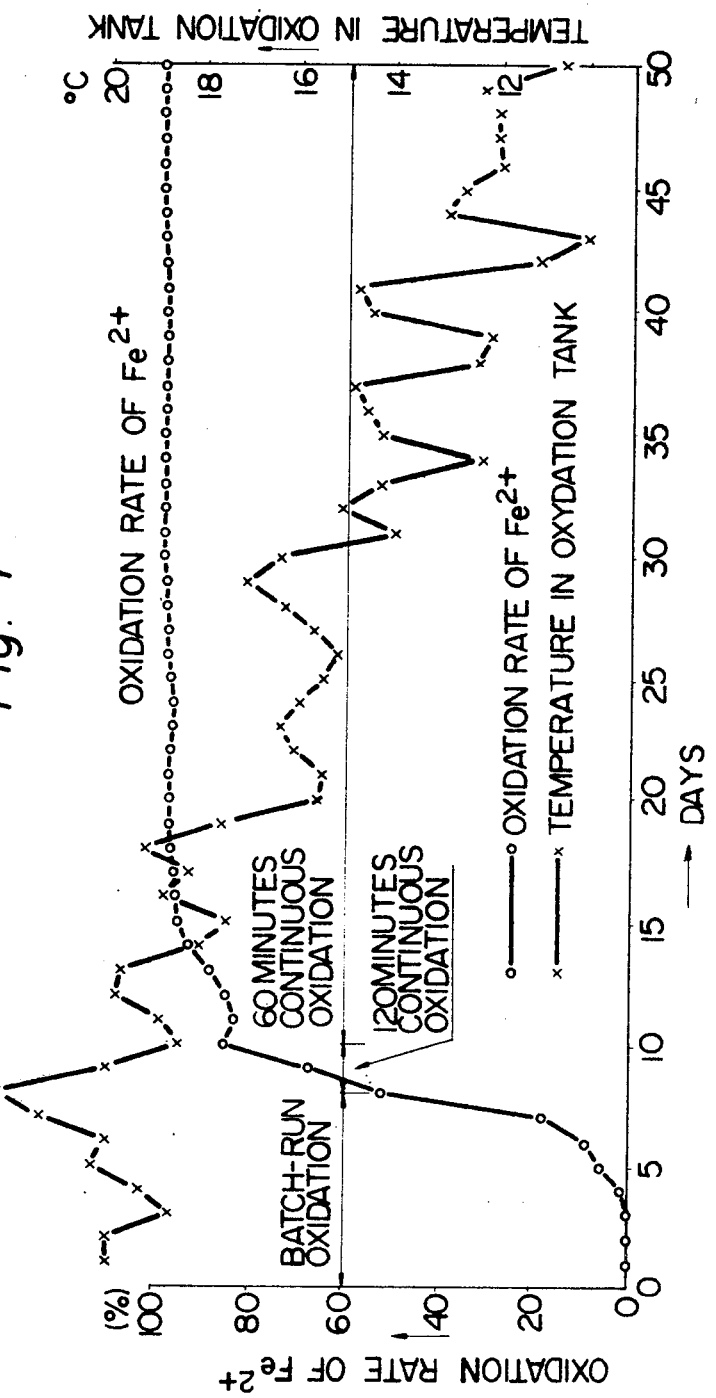

PROCESS FOR OXIDATION TREATMENT OF FE2+ IN WASTE WATER

This is a continuation, of application Ser. No. 631,903, filed Nov. 14, 1975, now abandoned.

This invention relates to a process for the oxidation with iron bacteria of the $Fe^{2+}$ contained in mine and other similar factory effluents. In particular, the present invention is concerned with an improved process for waste water treatment wherein the iron bacteria grow on porous materials utilizing the $Fe^{2+}$ in the waste water as the energy source, and the porous materials are repeatedly used to give efficient oxidation of the $Fe^{2+}$ in the presence of the constantly highly dense bacteria population.

In general, it is extremely advantageous to oxidize $Fe^{2+}$ to $Fe^{3+}$ beforehand in treatment for pollution control of acidic waste waters which are discharged from metal mines, dressing and refining plants and the like. This is because substantial $Fe^{2+}$ in the waste waters requires a substantial amount of neutralizing agent and makes the operation complicated.

Some ways of utilizing iron bacteria in the oxidation of $Fe^{2+}$ in these acidic waste waters have been suggested. For example, a process wherein iron bacteria are liquid-cultured in a treated waste water and the culture is poured into other waste water is described in Japanese Patent Publication No. 44717/72. This process, however, has drawbacks in that the number of bacteria per unit amount of the waste water to be treated is reduced because the original bacteria solution is diluted upon being added to the waste water to be treated, and the cells are lost when the treated waste water flows out of the system since the process is based on liquid-culture; this results in a lower oxidation rate.

Japanese Patent Publication No. 38981/72 based on the invention accomplished by the same inventors as of the present invention teaches a process to effect the oxidation of $Fe^{2+}$ and the culture of bacteria at the same time by using in situ produced iron oxides as adsorbents of the bacteria and partially recirculating the adsorbents. This process is surely beneficial in a relatively high pH range, but does not work well in a waste water the pH of which is in a lower range (for example, pH<2.0) to insure low production of basic salts, because the iron oxides are not present to work as adsorbents due to dissolution into the waste water to be treated.

In the drawings:

FIG. 4 is a graph showing the effect of the present process.

Figure 1:
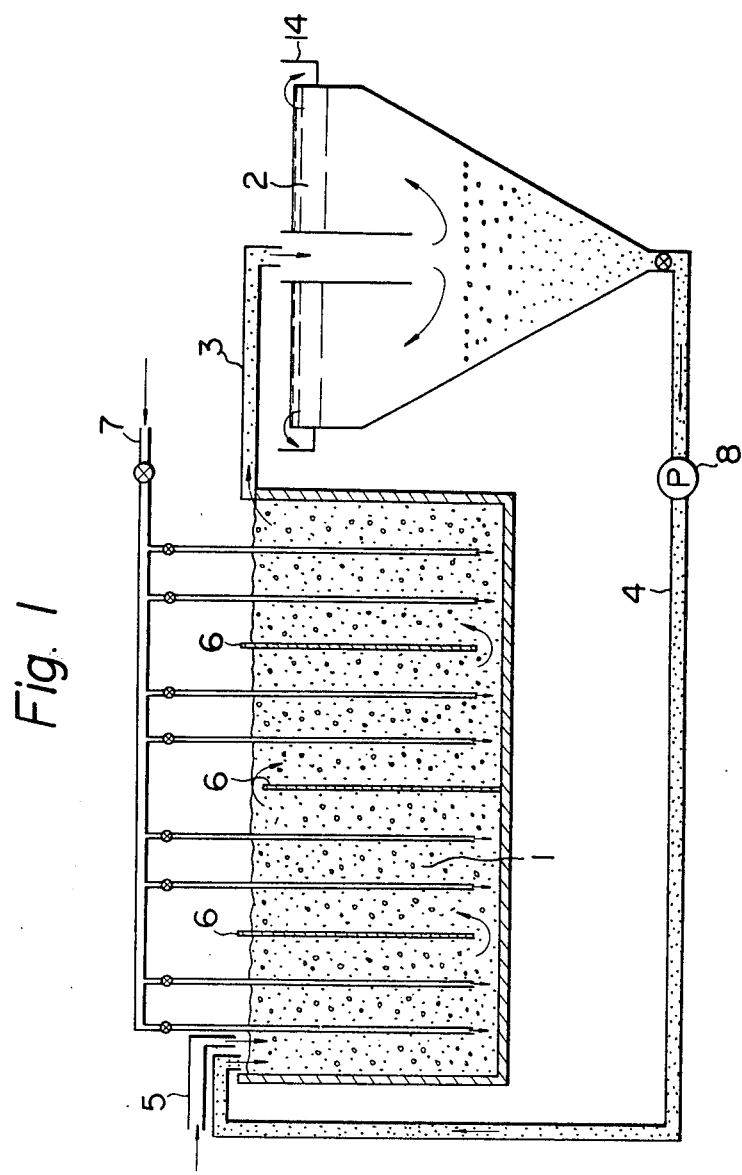
FIGS. 1-3 are rough views of the present systems in cross section.
Figure 2:
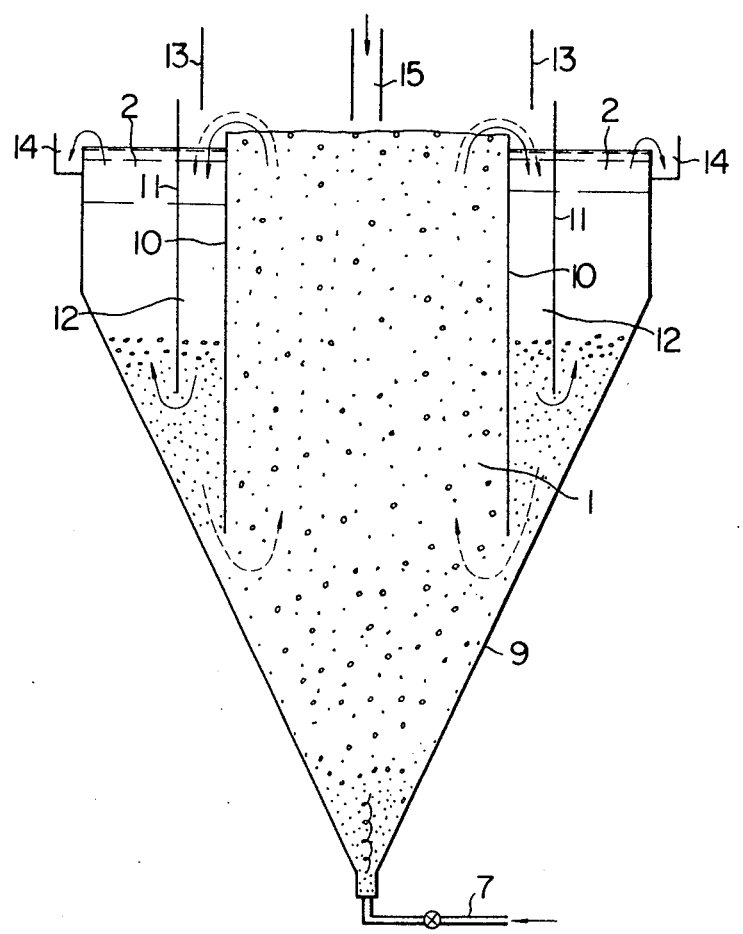
Figure 3:
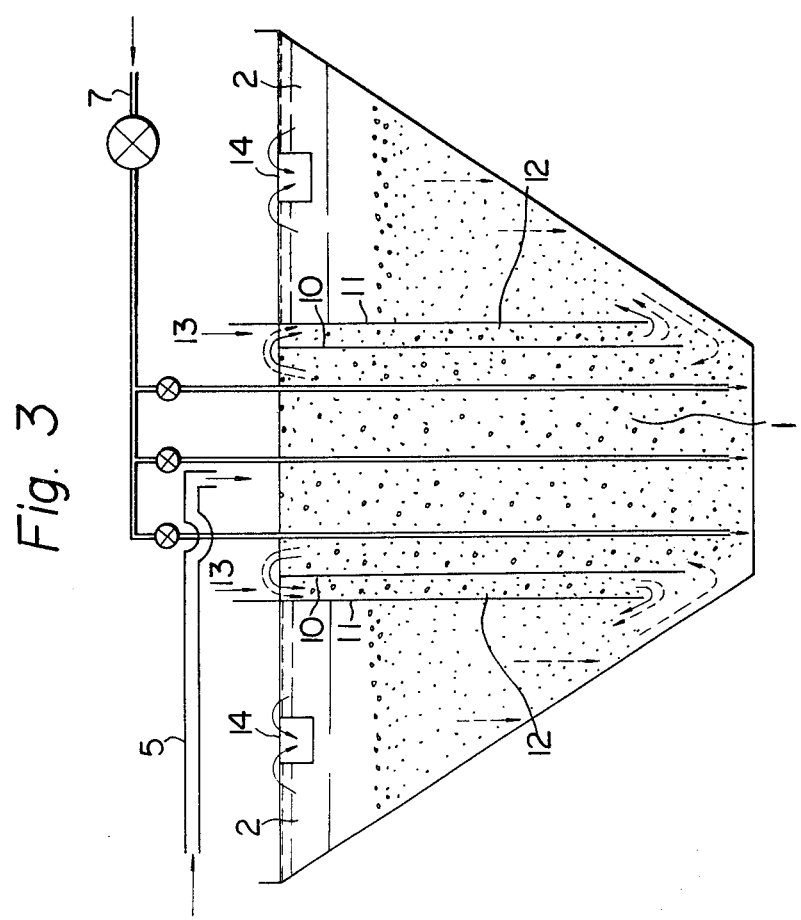

The reference numbers in FIGS. 1-3 have the following meaning.

1..... Oxidation tank (Oxidation and culture zone)
2..... Sedimentation tank (Sedimentation zone)
3..... Treated suspension delivering pipe
4..... Acid-resistant porous material return pipe
5..... Waste water inlet pipe
7..... Air pipe
14..... Oxidized waste water outlet pipe The present invention provides a process without the above-mentioned drawbacks of the prior art. In this process, the oxidation rate (amount) is improved by continually maintaining a high bacteria content and this makes it possible to conduct simultaneously the oxidation of the $Fe^{2+}$ in the waste water to be treated and the culture of the bacteria capable of oxidizing the $Fe^{2+}$ effectively even in a lower pH and temperature range. Namely, the present invention is a process for the oxidation with iron bacteria of the $Fe^{2+}$ contained in mine and other similar factory effluents at a pH so low as to provide little precipitation of basic salts, characterized by the following steps:

passing the stream of waste water to be treated to an oxidation and culture zone which includes beds of acid-resistant, porous and particulate material for the iron bacteria;

oxidizing the $Fe^{2+}$ in said oxidation and culture zone by agitating and blowing air into the waste water with particles suspended therein to culture the iron bacteria which inhabit the particles and utilize the $Fe^{2+}$ in the waste water as the energy source and at the same time to lower the $Fe^{2+}$ content of the waste water;

transferring the treated suspension of the iron bacteria-bearing particles from the oxidation and culture zone to a sedimentation zone;

recovering the oxidized waste water containing $Fe^{2+}$ in the sedimentation zone by precipitating to separate the particles from the treated suspension; and returning the separated particles which the iron bacteria inhabit to the oxidation and culture zone.

The process of the present invention is applicable to any acidic waste water containing the $Fe^{2+}$, and is especially advantageous when applied to waste water having such a pH range as to provide little precipitation of the basic salts of the $Fe^{3+}$, for example of 2.0 or lower. However, this invention is also applicable to such acidic range as of pH>2.0 if the precipitated salts are separated or circulated.

"An acid-resistant, porous and particulate material" as used in the present invention means any porous material with a surface area great enough for a large number of iron bacteria to inhabit it, and possesses the properties of readily flowing when agitated and of immediately precipitating with or without addition of coagulant when allowed to stand. We have found by experiments that particles of diatomaceous earth have these properties and are excellent as the porous material. For example, when acid-resistance, sedimentation by coagulation and/or flocculation and fluidity of the materials listed in Table 1 were examined, it was found that F-type diatomaceous earth is especially effective when used in the present invention.

The test results of each of the diatomaceous earths of Types A-F in X-ray diffraction did not reflect the difference in constituent elements. But, as shown in Table 2, the measurements of specific surface area indicated that F-type diatomaceous earth is preferable as a bed material for iron bacteria since it has a large specific surface area and thus can maintain many bacteria adsorbed thereon.

Table 1

| Materials | Items Acid-resistance | Coagulation or flocculation and sedimentation | Fluidity |
|---|---|---|---|
| A-type diatomaceous earth | O* | O | X |
| B-type diatomaceous earth | O | X | X |
| C-type diatomaceous earth | O | X | X |
| D-type diatomaceous earth | O | X | X |
| E-type diatomaceous earth | X* | O | X |
| F-type diatomaceous earth | O | O | O |
| Synthetic zeolite | O | O | X |
| Effloresced granite | O | O | X |
| Slate powder | O | O | X |

Table 1-continued

| Materials | Items | Acid-resistance | Coagulation or flocculation and sedimentation | Fluidity |
|---|---|---|---|---|
| Dressing slime | | X | O | X |

O represents high, and X represents low.

Table 2

| Materials | Item Specific surface area (cm$^2$/g) |
|---|---|
| A-type diatomaceous earth | 42128 |
| B-type diatomaceous earth | 29605 |
| C-type diatomaceous earth | 14341 |
| D-type diatomaceous earth | 48481 |
| E-type diatomaceous earth | 90347 |
| F-type diatomaceous earth | 367242 |

Embodiments of the present invention which continuously oxidize the $Fe^{2+}$ in waste water by culturing iron bacteria in a densely populated state using as their bed an acid-resistant, porous and particulate material with such a large surface area as shown in Table 2 and utilizing the $Fe^{2+}$ as the energy source will be illustrated with reference to the attached drawing. In the drawing, FIG. 1 is a view of a circulation-type system divided by vertical partitions into several compartments suitable for use in carrying out the present invention; and FIG. 2 is a view of an automatic circulation-type conical system used in carrying out the present invention.

In FIG. 1, the circulation-type system is composed by separately disposing an oxidation tank 1 constituting an oxidation and culture zone, and positioning a liquid delivery pipe 3 for a suspension and a return pipe 4 for a porous particulate material between them.

In the oxidation tank, the acidic waste water which is introduced through a waste water inlet pipe 5 is oxidized by iron bacteria supported on particles of a porous material such as diatomaceous earth suspended and movable in the oxidation tank 1. That is, in the course of streaming through the tank divided into compartments by partitioning-boards 6 to a liquid delivery pipe 3, the waste water is contacted with diatomaceous earth which is circulated from the return pipe 4 and is subjected to oxidation treatment while keeping suspension conditions by blowing a stream of air into the water through an air pipe 7. The bacteria which inhabit the diatomaceous earth grow, utilizing the $Fe^{2+}$ in the waste water as the energy source, until the number of the bacteria reaches the maximum for the surface area of the diatomaceous earth. Accordingly, the larger the specific surface area of the porous particles, the easier the oxidation of the $Fe^{2+}$ due to increase in the cell number of the bacteria on the particles. Thus, the cell number reaches its maximum in the waste water with bacteria adsorbed on the particles circulated through the return pipe 4 and those on fresh porous particles. On the other hand, the $Fe^{2+}$ in the waste water is oxidized by the highly dense bacteria population and supplied to the next step almost in the form of $Fe^{3+}$.

The oxidized suspension, which flows through the liquid delivery pipe 3 into the sedimentation tank 2 together with the porous particulate materials such as diatomaceous earth, is separated into solid and liquid phases in the sedimentation tank 2, and the diatomaceous earth precipitated at the bottom is circulated together with the cells adsorbed thereon through the return pipe 4 to the upper part of the oxidation tank 1 by a pump 8.

The treated waste water, the $Fe^{2+}$ content of which has decreased due to oxidation of almost all of the $Fe^{2+}$ to $Fe^{3+}$, is discharged from the upper part of the sedimentation tank and supplied for subsequent treatment such as neutralization, metal ion recovery and the like.

FIG. 2 exemplifies a system which makes it possible to conduct an oxidation and culture step and a sedimentation step in one container. This system of FIG. 2 is formed by disposing an inner pipe 10 in a reversed-conical container 9 without contact to provide an oxidation and culture zone (oxidation tank 1) therebetween, positioning further an exterior pipe 11 around the inner pipe 10 to provide a coagulation and/or flocculation zone, and instituting a sedimentation zone (sedimentation tank 2) in the periphery of the exterior pipe 11.

A stream of waste water to be treated is injected into the oxidation tank 1 through a waste water inlet pipe 5 located at the upper part thereof, and a stream of air is blown into the tank 1 through an air pipe 7 located at the bottom thereof. By this, the porous particles of for example diatomaceous earth present in the oxidation tank 1 float, and as previously explained with reference to FIG. 1 the formation of a dense bacteria population and the oxidation of the $Fe^{2+}$ proceed at the same time. The oxidized suspension overflows over the top of the oxidation tank 1 into a flocculation zone 12. In this flocculation zone 12, the flocculation of the diatomaceous earth particles is facilitated for example with addition of a high-molecular coagulant(s) through its upper opening 13. A part of the flocculated diatomaceous earth precipitates and is sent to the oxidation tank 1 through the bottom slit of the inner pipe 10. The remaining diatomaceous earth particles go along with the waste water into the encircling sedimentation zone (sedimentation tank) 2 wherein there is no agitation action, and precipitate there. Then the particles are circulated into the oxidation tank 1 through the bottom slits of the inner pipe 10 and the exterior pipe 11, and the oxidized waste water from which the precipitated diatomaceous earth particles have been separated is recovered at 14.

Thus, even in the above automatic circulation-type conical system iron bacteria can make use of porous particles as their bed, and grow utilizing the $Fe^{2+}$ in the waste water to be treated as the energy source; by this the cell population on the particles is always maintained at a saturated level, and thus the oxidation rate of the $Fe^{2+}$ increases.

The system shown in FIG. 3 has the same function as that illustrated in FIG. 2, and is modified to provide a flat plane at the bottom to improve execution and structure. The reference numbers in FIG. 3 have the same meaning as do the corresponding numbers in FIG. 2.

The present process may be applied to a batch-wise operation in factories discharging a minor amount of waste water at a lower pH; the waste water is stored in a tank for a predetermined number of days, then streams into an oxidation tank wherein iron bacteria are cultured, and is air-blown for a predetermined period of time to oxidize the $Fe^{2+}$ to $Fe^{3+}$. After complete oxidation, the air-supplying is stopped and the precipitate is separated to give a supernatant containing the $Fe^{3+}$.

The following example is an illustration of the present invention using the automatic-circulation type conical system as shown in FIG. 2.

EXAMPLE

A stream of an acidic mine effluent was supplied into a system of 300 liter capacity as shown in FIG. 2 at a rate of 5 l/min. for 50 days. Particles of diatomaceous earth (6 w/v%; specifically, F-type diatomaceous earth in Table 1) have been added to, and a stream of air of 80 l/min. has been blown through the air pipe 7 into the oxidation tank 1. The properties of the mine effluent to be treated are tabulated in Table 3 which includes the maximum and minimum values of conditions such as the temperature, pH and components content of the waste water fed to the system during the fifty-day run.

Table 3

| | |
|---|---|
| Temperature of waste water (° C) | 2 - 20 |
| Mean cell number (per ml) | $25 \times 10^4$ |
| pH | 1.5 - 1.60 |
| Total Fe (mg/l) | 876 - 1040 |
| $Fe^{2+}$ (mg/l) | 856 - 1010 |
| Al (mg/l) | 200 - 250 |
| $SO_3$ (mg/l) | 4000 - 5000 |

Table 4

| Days | $Fe^{2+}$ content of mine effluent before oxidation (mg/l) | $Fe^{2+}$ content of oxidized mine effluent (mg/l) | Oxidation rate | Remark |
|---|---|---|---|---|
| 1 | 966 | 966 | 0 | |
| 2 | " | 961 | 0.5 | |
| 3 | " | 956 | 1.0 | |
| 4 | " | 952 | 1.5 | Batch-wise oxidation |
| 5 | " | 930 | 3.7 | |
| 6 | " | 887 | 8.2 | |
| 7 | " | 792 | 18.0 | |
| 8 | " | 464 | 52.0 | |
| 9 | 1010 | 334 | 66.9 | Two hour continuous oxidation |
| 10 | 966 | 146 | 84.9 | |
| 11 | " | 168 | 82.6 | |
| 12 | " | 144 | 85.1 | |
| 13 | " | 114 | 88.2 | |
| 14 | 955 | 72 | 92.5 | |
| 15 | 966 | 49 | 94.9 | |
| 16 | 955 | 43 | 95.5 | |
| 17 | 966 | 41 | 95.8 | One hour continuous oxidation |
| 18 | 955 | 52 | 96.6 | |
| 19 | 944 | 30 | 96.8 | |
| 20 | 955 | 31 | 96.8 | |
| 21 | 944 | 27 | 97.1 | |
| 22 | " | " | " | |
| 23 | " | 25 | 97.3 | |
| 24 | " | 24 | 97.5 | |
| 25 | " | " | " | |
| 26 | 933 | 23 | 97.5 | |
| 27 | " | " | " | |
| 28 | 955 | 24 | " | |
| 29 | 944 | 22 | 97.7 | |
| 30 | 933 | 21 | " | |
| 31 | " | 15 | 98.4 | |
| 32 | " | " | " | |
| 33 | 944 | " | " | |
| 34 | 933 | 14 | 98.5 | |
| 35 | " | " | " | |
| 36 | 922 | " | " | |
| 37 | 900 | " | " | One hour continuous oxidation |
| 38 | " | " | " | |
| 39 | 888 | 13 | " | |
| 40 | " | " | " | |
| 41 | 880 | 12 | 98.6 | |
| 42 | " | " | " | |
| 43 | 868 | 10 | 98.8 | |
| 44 | " | " | 98.9 | |
| 45 | " | " | " | |
| 46 | 856 | 9 | 99.0 | |
| 47 | " | 8 | 99.1 | |
| 48 | " | " | " | |
| 49 | " | " | " | |
| 50 | " | " | " | |

The $Fe^{2+}$ content of the waste water before and after treatment according to the present invention was measured everyday during the fifty-day treatment and the oxidation rate of the $Fe^{2+}$ was calculated. The results are shown in Table 4.

The above results show that the iron bacteria in the waste water to be treated reach the diatomaceous earth bed and grow thereon, and in about ten days the bed becomes saturated with the bacteria, and later this saturation is kept, which makes it possible to maintain the reduced $Fe^{2+}$ content of the oxidized water to ensure an increased oxidation rate of almost 100%.

With full regard to the fact that the generation of ordinary iron bacteria seems to be about 20 hours, continuous culture of iron bacteria in a diatomaceous earth bed provides conditions extremely effective for oxidation of the $Fe^{2+}$ in waste water.

In addition to the result given in Table 4, the temperature change in the oxidation tank is represented graphically in FIG. 4. FIG. 4 indicates that almost 100% of oxidation rate is obtained independently of the temperature change if the diatomaceous earth bed is saturated with iron bacteria.

As is clear from the above-mentioned, the process of the present invention provides continuous oxidation of $Fe^{2+}$ with a rate of almost 100% effectiveness. Further advantages of the process of the present invention as compared with the prior art processes are as given below:

(1) In contrast to conventional process based on liquid-culture, the cell content in the oxidation zone is not reduced, but is increased to raise the cell number per unit amount of the waste water to be treated. Accordingly, it is possible to obtain a high oxidation rate even in treating a large amount of waste water (2) For the same reason as the above, the present process is operable in a relatively low temperature range in view of the existing established theory on the temperature conditions, and thus effective oxidation is possible even at extremely low temperatures; whereas "the existing established theory on the temperature conditions" is that the oxidation rate (amount) suddenly drops at temperatures below 20° C., and "extremely low temperatures" are the lowest temperatures within the range in which the waste water to be treated does not freeze;

(3) By the use of anti-acid porous particles, the present invention may be applied to the waste water the pH of which is lower than 2.0; and (4) Separate culture equipment is not necessary, and the culture is possible in the waste water treatment plant according to the present invention.

What we claim is:

1. A process for the oxidation with iron bacteria of the $Fe^{2+}$ contained in mine and other similar factory effluents at a pH of 2.0 or lower to provide little precipitation of basic salts, characterized by the following steps:

passing the stream of waste water, at said pH, to be treated to an oxidation and culture zone which includes a bed of a particulate material consisting essentially of an acid-resistant, porous and particulate diatomaceous earth having a specific surface area of from about 14,000 to about 370,000 cm²/g. for the iron bacteria;

oxidizing the $Fe^{2+}$ by agitating and blowing air into the waste water with said particles suspended therein to culture the iron bacteria which inhabit the particles and utilize the $Fe^{2+}$ in the waste water as the energy source and at the same time to lower the $Fe^{2+}$ content of the waste water;

transferring the treated suspension of the iron bacteria-bearing particles from the oxidation and culture zone to a sedimentation zone;

recovering the $Fe^{3+}$-containing oxidized waste water in the sedimentation zone by precipitation to separate the particles from the treated suspension; and returning the separated particles which the iron bacteria inhabit to the oxidation and culture zone.

2. The process of claim 1, wherein the said particulate material is F-type diatomaceous earth having a specific surface area of about 370,000 $cm^2/g$.

* * * * *